United States Patent
Liu et al.

(10) Patent No.: US 7,542,789 B2
(45) Date of Patent: Jun. 2, 2009

(54) BATTERY COVER ASSEMBLY FOR A PORTABLE ELECTRONIC DEVICE

(75) Inventors: Tai-Jun Liu, Shenzhen (CN); Ye Liu, Shenzhen (CN); Gang Yang, Shenzhen (CN); Shui-Yuan Qin, Shenzhen (CN); Hsiao-Hua Tu, Tu-cheng (TW); Chia-Hua Chen, Tu-cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 419 days.

(21) Appl. No.: 11/299,011

(22) Filed: Dec. 9, 2005

(65) Prior Publication Data

US 2006/0126298 A1 Jun. 15, 2006

(30) Foreign Application Priority Data

Dec. 11, 2004 (CN) ......................... 2004 2 0102797

(51) Int. Cl.
*H04M 1/00* (2006.01)
*H02B 1/00* (2006.01)
*H05K 5/00* (2006.01)
*H05K 7/20* (2006.01)

(52) U.S. Cl. ............ 455/575.8; 455/575.1; 379/428.01; 379/433.11; 361/600; 361/679; 361/700

(58) Field of Classification Search ... 455/575.1–575.9; 361/600, 679, 700; 379/428.01, 433.11
See application file for complete search history.

(56) References Cited

U.S. PATENT DOCUMENTS

| | | | | |
|---|---|---|---|---|
| 4,712,898 | A | * | 12/1987 | Haraguchi ................... 396/539 |
| 5,535,437 | A | * | 7/1996 | Karl et al. ................. 455/575.1 |
| 5,933,330 | A | * | 8/1999 | Beutler et al. ............... 361/814 |
| 5,999,822 | A | * | 12/1999 | Wicks et al. ............. 455/575.1 |
| 7,261,973 | B2 | * | 8/2007 | Tu et al. ...................... 429/100 |
| 7,303,424 | B2 | * | 12/2007 | Tu et al. ...................... 439/372 |
| 7,309,253 | B2 | * | 12/2007 | Ge et al. ...................... 439/500 |
| 7,333,839 | B2 | * | 2/2008 | Hutchinson et al. ....... 455/575.1 |
| 2004/0145872 | A1 | * | 7/2004 | Zhou .......................... 361/747 |
| 2004/0192418 | A1 | * | 9/2004 | Nam ........................ 455/575.1 |
| 2004/0228072 | A1 | * | 11/2004 | Chen et al. .................. 361/600 |
| 2006/0287013 | A1 | * | 12/2006 | Kim ......................... 455/575.1 |

* cited by examiner

*Primary Examiner*—Lester Kincaid
*Assistant Examiner*—Nathan Mitchell
(74) *Attorney, Agent, or Firm*—Steven M. Reiss

(57) ABSTRACT

A battery cover assembly (10) includes a housing (1), a connecting member (2), a cover (3), a latching section (6), an engaging board (8), and a button (9). The housing defines a locking hole (112) and a button hole (110). The connecting member includes a main body (22) and a sliding section (222) angled therefrom. The cover includes a sliding groove and a claw (32), the sliding section engaging the sliding groove. The latching section includes a body (62), a claw hole (622), and a stand arm (642). The stand arm passes through the locking hole, and the claw engages in the claw hole. The engaging board defines a first hole (82) and a fixing hole (84), and the stand arm engages the fixing hole. The button is received in the button hole and is configured for selectably maintaining the cover in a closed position relative to the housing.

16 Claims, 6 Drawing Sheets

BATTERY COVER ASSEMBLY FOR A PORTABLE ELECTRONIC DEVICE

BACKGROUND OF THE INVENTION

1. Field of the Invention

The present invention generally relates to battery cover assemblies and, more particularly, to a battery cover assembly for use in a portable electronic device.

2. Discussion of the Related Art

Batteries are widely used in portable electronic devices such as personal digital assistants (PDAs) and telephones. A battery is usually removably mounted in a receptacle of a housing of an electronic device. The receptacle is generally covered by a battery cover. When the battery is damaged, dead, or in need of recharging, the cover is removed from the housing, whereupon the battery can be taken out and later replaced.

A fixing/attachment mechanism is generally employed in a conventional battery cover, to engage with a housing of the portable electronic device. For example, a battery cover of an Alcatel® OT310 telephone includes a fixing mechanism. The fixing mechanism incorporates a pair of hooks arranged at a lower end of the battery cover and a locking pin arranged at an upper end thereof. Correspondingly, a pair of slots is defined at a lower end of a backside of the housing, and a locking hole is defined at an upper end of the back side. In assembly, the hooks are inserted into the corresponding slots. Then, the battery cover is pressed downwardly such that the locking pins of the battery cover are inserted into the corresponding locking holes of the housing. The battery cover is thus assembled to the housing of the telephone. The battery cover is simple in structure, and the engagement between the battery cover and the housing of the telephone is secure. However, during disassembly of the cover from the housing of the telephone, the battery cover is liable to be damaged because great force has to be exerted on the battery cover to detach the battery cover from the housing. As a result, it can be inconvenient for a user to change a battery.

What is needed, therefore, is a new battery cover assembly for a portable electronic device which makes it convenient for a user to detach a battery cover from a housing of the portable electronic device.

SUMMARY OF THE INVENTION

In a preferred embodiment, a battery cover assembly is provided for use in a portable electronic device. The battery cover assembly includes a housing, a connecting member, a cover, a shaft, a latching section, an engaging board, and a button. The housing defines a containing portion, a locking hole, and a button hole. The connecting member includes a main body and a sliding section bent from the main body. The cover includes a sliding groove and a claw, the sliding section of the connecting member is slidably engaged in the sliding groove. The shaft is rotatably engaged with the connecting member, and the shaft is located in the containing portion of the housing. The latching section includes a body and a stand arm extending from the body, and the stand arm is passed through the locking hole of the housing. The body has a claw hole defined therein, and the claw of the cover is engaged in the claw hole. The engaging board has a first hole and a fixing hole therein. The stand arm of the latching section is engaged in the fixing hole, after the stand arm is passed through the locking hole of the housing. The button is received in the button hole, after the button is passed through the first hole of the engaging board.

A main advantage of the above-described battery cover assembly is that the button is received in the button hole of the housing and in the hole of the engaging board. As such, the cover can be released from the housing easily and conveniently just by turning the button. The cover is thus convenient for a user to open and close.

Other advantages and novel features of preferred embodiments of the present battery cover assembly and its applications will become more apparent from the following detailed description when taken in conjunction with the accompanying drawings.

BRIEF DESCRIPTION OF THE DRAWINGS

Many aspects of the present battery cover assemblies and their applications can be better understood with reference to the following drawings. The components in the drawings are not necessarily to scale, the emphasis instead being placed upon clearly illustrating the principles of the battery cover assemblies. Moreover, in the drawings, like reference numerals designate corresponding parts throughout the several views.

DETAILED DESCRIPTION OF PREFERRED EMBODIMENTS

The present invention is suitable for portable electronic devices, such as mobile phones, PDAs, and so on.

Figure 1:
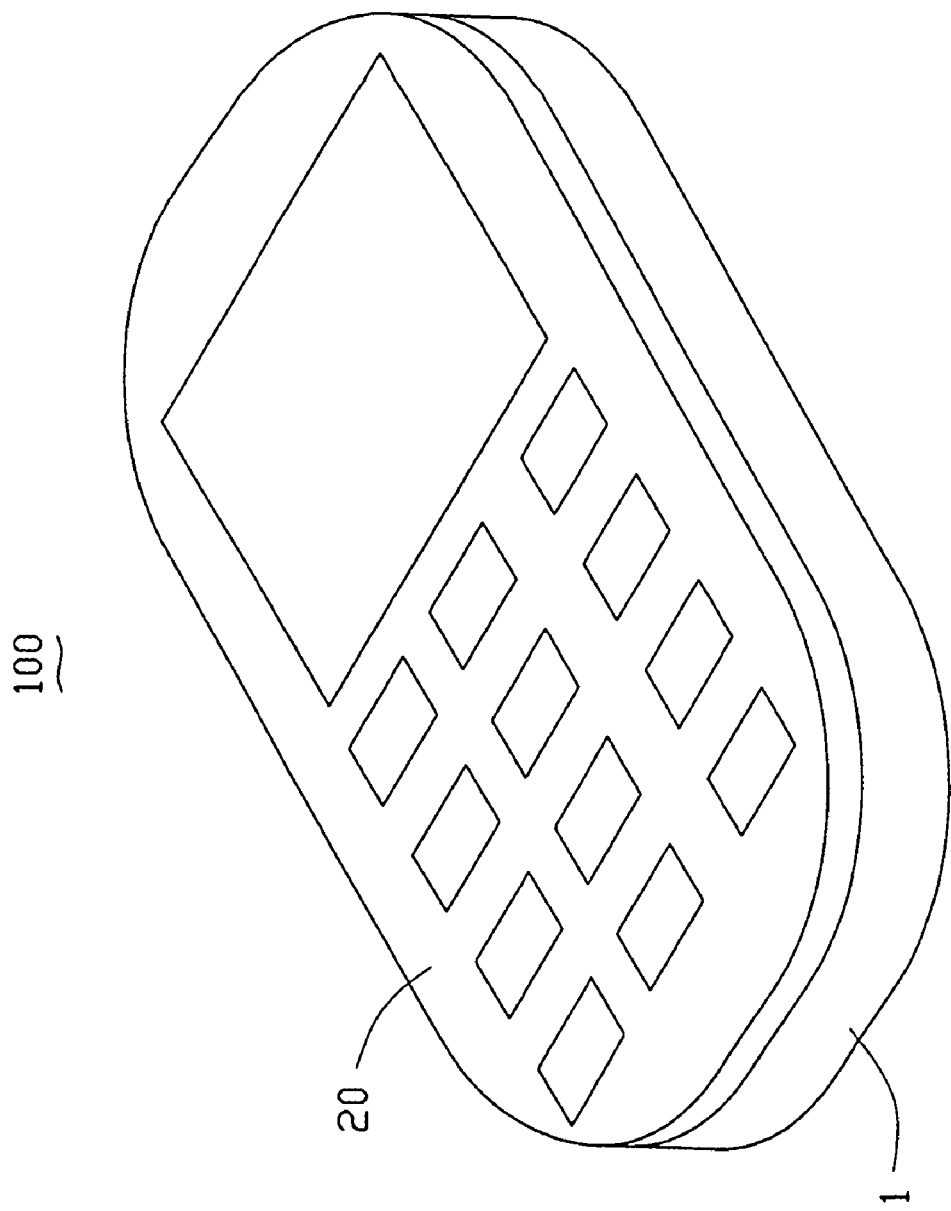
FIG. 1 is an isometric view of a mobile phone including a main housing and a battery cover assembly, in accordance with a preferred embodiment of the present battery cover assemblies.
Figure 2:
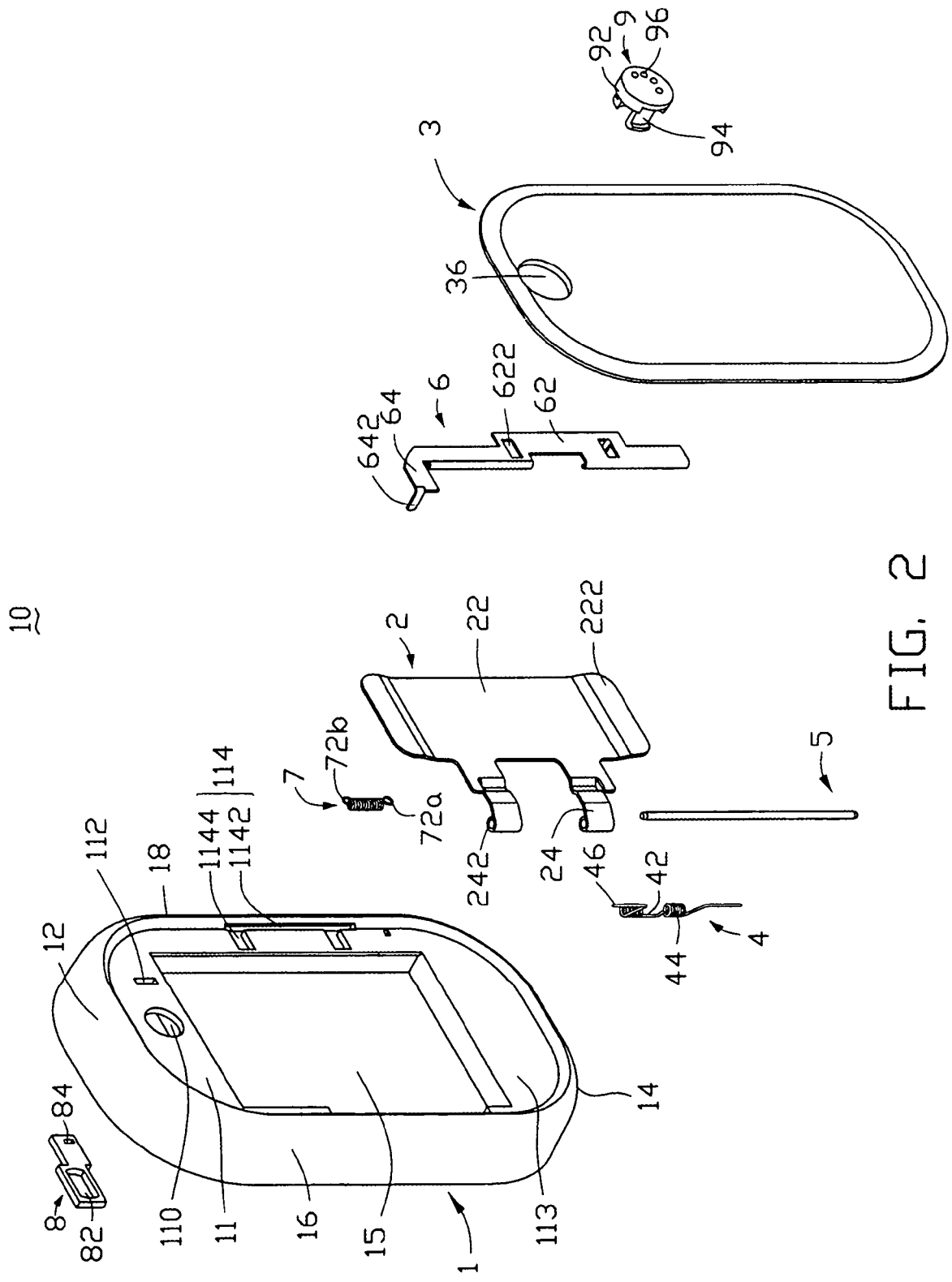
FIG. 2 is an exploded, isometric view of the battery cover assembly of FIG. 1.

Referring now to the drawings, FIG. 1 and FIG. 2 show a mobile phone 100, which includes a battery cover assembly 10 and a main housing 20 according to a preferred embodiment of the present battery cover assemblies. The mobile phone 100 is taken here as an exemplary application, for the purposes of describing details of the battery cover assembly 10. The battery cover assembly 10 includes a housing 1 (i.e., a battery housing), a connecting member 2, a removable battery cover 3, a torsion spring 4, a shaft 5, a latching section 6, a compression spring 7, an engaging board 8, and a button 9. The main housing 20 carries the display and keypad (each not labeled) and can help house the electronics (not shown) of the mobile phone 100.

Figure 3:
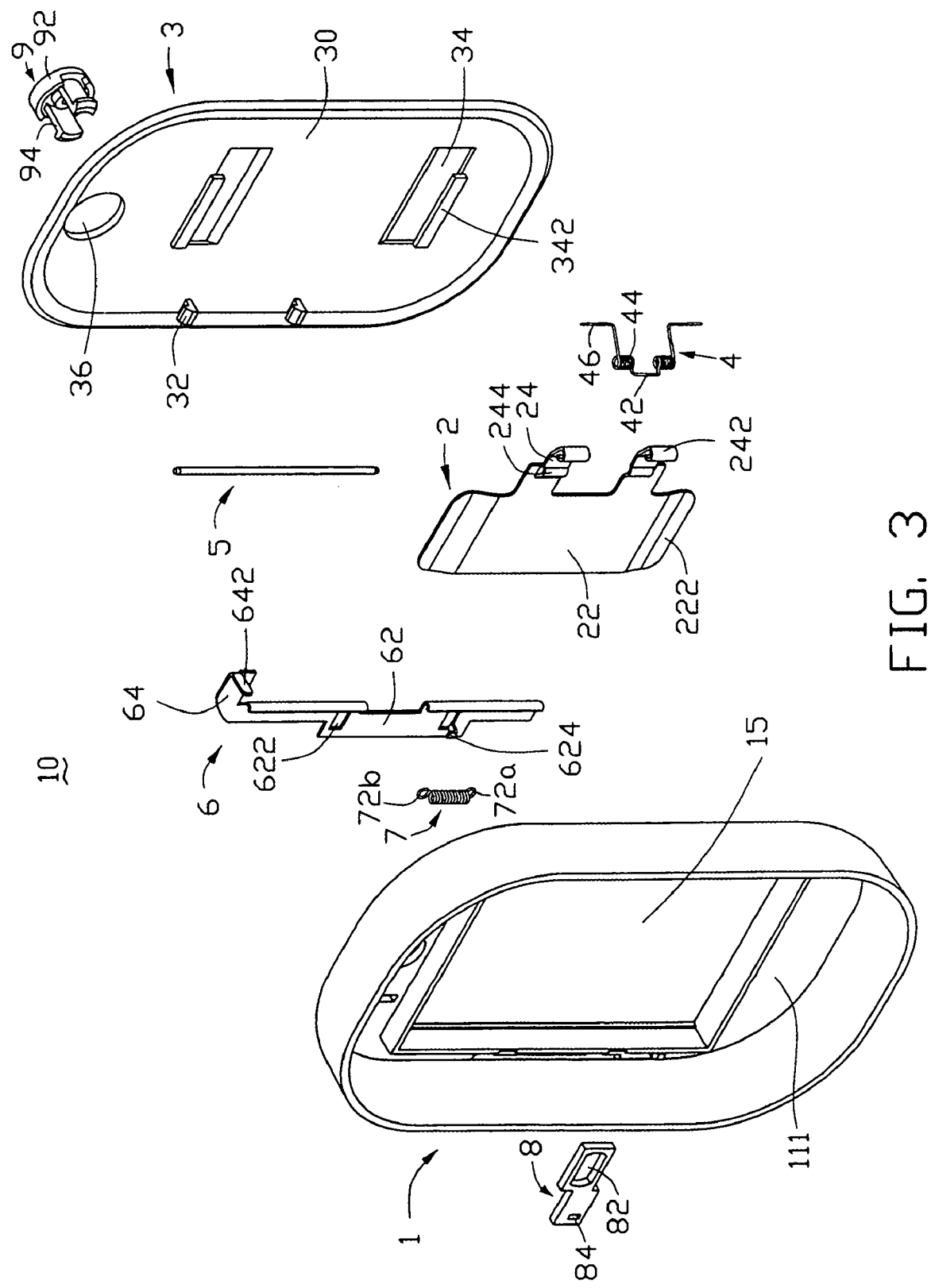
FIG. 3 is similar to FIG. 2, but viewed from another aspect.
Figure 5:
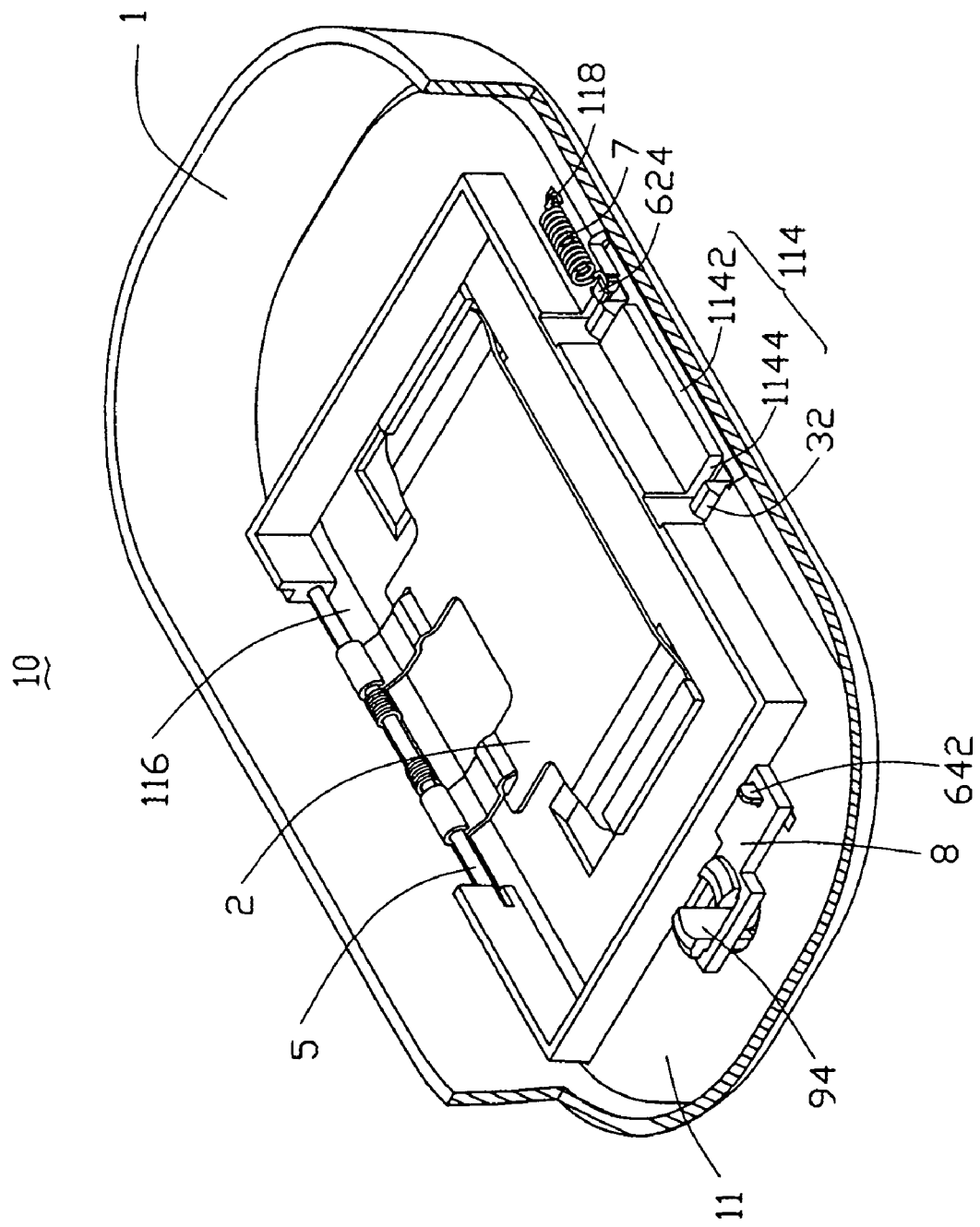
FIG. 5 is an enlarged, assembled, partially cut-away view of the battery cover assembly shown in FIG. 2.

Referring also to FIG. 3 and FIG. 5, the housing 1 is substantially a rectangular space, which is made up of a top wall 12, a bottom wall 14, a left sidewall 16, and a right sidewall 18. The housing 1 includes a main partition wall 11, and the partition wall 11 separates a first compartment 111 from an opposite second compartment 113. The first compartment 111 is advantageously configured for accommodating an electronic device (not shown), such as a printed circuit board, therein. This accommodation occurs when the housing 1 is assembled with other housings (e.g., main housing 20) of the mobile phone 100. The second compartment 113 is used to engagingly receive the cover 3. A recess 115 is defined in a middle portion of the partition wall 11 at the second compartment 113. The recess 115 is used to receive a battery (not shown). A button hole 110 and a locking hole 112 are both defined in the partition wall 11 adjacent the top wall 12, and the locking hole 112 is also adjacent the right sidewall 18. A compounding groove 114 is defined in the partition wall 11 adjacent the right sidewall 18. The compounding groove 114 includes two opposite side grooves 1144 and a transverse groove 1142 perpendicularly interconnecting top ends of the side grooves 1144. The transverse groove 1142 is apart from the recess 115 and extends toward the bottom wall 14. A containing portion 116 is defined in the partition wall 11 adjacent the left sidewall 16. At the first compartment 111, a clasp 118 is disposed in the partition wall 11, adjacent the right sidewall 18 and the bottom wall 14.

The connecting member 2 is made of elastic material. The connecting member 2 includes a main body 22 and a pair of symmetrical bent portions 24. The main body 22 is substantially a rectangular plate and includes two opposite long sides and two opposite short sides. A pair of symmetrical sliding sections 222 is bent/angled appreciably from/relative to the two short sides, respectively. The bent portions 24 extend from the long side of the main body 22. A folded portion 242 is formed at one end of each bent portion 24. A catching portion 244 is formed between each bent portion 24 and the main body 22.

The cover 3 can be a single piece of shaped sheet material. The cover 3 is substantially a rectangular sheet and includes two opposite long sides and two opposite short sides. The cover 3 has an inner surface 30. A pair of symmetrical claws 32 extends from the inner surface 30, adjacent the long side of the cover 3. A pair of symmetrical indents/recesses 34 is defined in the middle of the inner surface 30 of the cover 3, and a length of each indent 34 is larger than that of the sliding section 222 of the connecting member 2. A pair of symmetrical elastic ribs 342 is disposed in the inner surface 30 of the cover 3, respectively adjacent the indents 34. Each rib 342 and a corresponding indent 34 forms a sliding groove, and each sliding section 222 of the connecting member 2 is slidably engaged in a corresponding sliding groove. A thin hole 36 is defined in the cover 3, adjacent one short side of the cover 3. A diameter of the thin hole 36 is slightly larger than that of the button hole 110 of the housing 1.

The torsion spring 4 includes a fixing portion 42, two symmetrical column portions 44 extending from two respective ends of the fixing portion 42 and two symmetrical locking ends 46 extending from the respective column portions 44. The locking ends 46 are respectively engaged with the catching portions 244 of the connecting member 2.

The shaft 5 is a generally thin, long cylinder. A diameter of the shaft 5 is slightly smaller than that of the folded/bent portions 242 of the connecting member 2 and the column portions 44 of the torsion spring 4.

The latching section 6 includes a body 62 and an arm 64 extending from the body 62. A pair of symmetrical claw holes 622 is defined in the middle of the body 62, and the claws 32 of the cover 3 are engaged in the claw holes 622. A hook 624 is disposed in the body 62, adjacent the claw hole 622 apart from the arm 64. A stand arm 642 extends perpendicularly from the arm 64, and the stand arm 642 is movably engaged in the locking hole 112 of the housing 1.

The compression spring 7 is advantageously helical in configuration and made of metal. The compression spring 7 has two fingers 72. One finger 72a is engaged with the clasp 118 of the housing 1, and the other finger 72b is engaged with the hook 624 of the latching section 6.

The engaging board 8 defines a rectangular hole 82 and a fixing hole 84. The stand arm 642 of the latching section 6 is engaged in the fixing hole 84.

The button 9 is made of an elastic material and has a main portion 92, a pair of symmetrical cantilevers 94 extending from an inner surface of the main portion 92. The cantilevers 94 are L-shaped. The main portion 92 is a generally cylindrical body. A diameter of the main portion 92 is slightly larger than that of the button hole 110 of the housing 1 and is slightly smaller than that of the thin hole 36 of the cover 3. A plurality of convexities/bumps 96 are disposed in an opposite outer surface of the main portion 92, in order to increase friction with a user's finger(s), thereby facilitating turning of the button 9.

Figure 4:
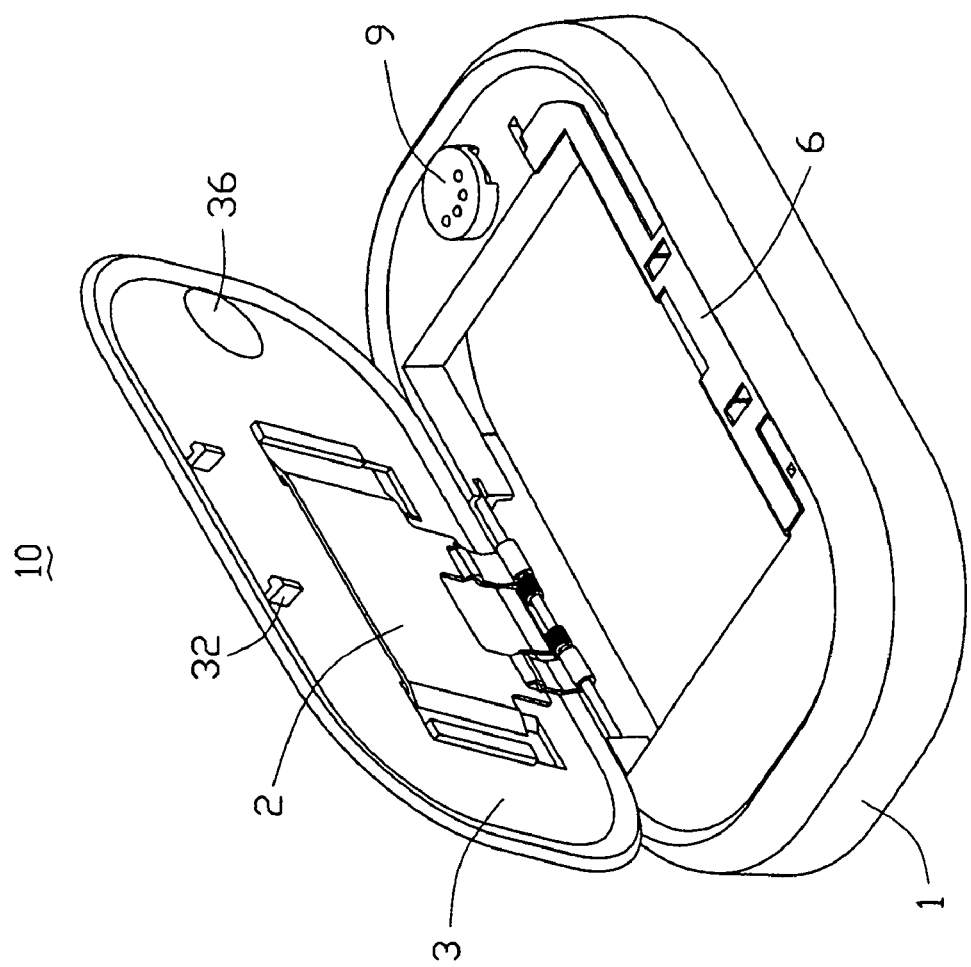
FIG. 4 is an assembled view of the battery cover assembly shown in FIG. 2.

Referring further to FIG. 4, in assembly, first, the sliding sections 222 of the connecting member 2 slide into the sliding grooves formed by the ribs 342 and the indents 34 of the cover 3. In a sliding process, the connecting member 2 is deformed by an outer force (e.g., mechanically or by hand). At the same time, each sliding section 222 of the connecting member 2 is slidably contained in the corresponding indent 34. Second, the shaft 5 is passed through one folded portion 242 of the connecting member 2, the column portions 44 of the torsion spring 4, and the other folded portion 242 of the connecting member 2, in that order. The locking ends 46 of the torsion spring 4 are received in the catching portions 244 of the connecting member 2, respectively. At the second compartment 113, the shaft 5, together with the connecting member 2, the cover 3, and the torsion spring 4, is received in the containing portion 116 of the housing 1, and the fixing portion 42 of the torsion spring 4 resists the left sidewall 116 of the housing 1.

Then, continuing the assembly process, the latching section 6 is located in the partition wall 11 of the housing 1, adjacent the right sidewall 18, at the second compartment 113. At this time, the claw hole 622 adjacent the arm 64 of the latching section 6 communicates with the side groove 1144 adjacent the top wall 12, and the claw hole 622 apart from the arm 64 of the latching section 6 communicates with the side groove 1144 adjacent the bottom wall 14. Concurrently, the hook 624 is passed through the side groove 1144 adjacent the bottom wall 14. At the first compartment 111, the engaging board 8 is located in the partition wall 11 of the housing 1, adjacent the top wall 12. At this time, the rectangular hole 82 and the fixing hole 84 of the engaging board 8 positioned in communication with the button hole 110 and the locking hole 112 of the housing 1, respectively. The stand arm 642 of the latching section 6 is passed through the locking hole 112 of the housing 1 and the fixing hole 84 of the engaging board 8, in that order. The main portion 92 of the button 9 is inserted into the rectangular hole 82 of the engaging board 8 and the button hole 110 of the housing 1, in that order. In an inserting process, the main portion 92 of the button 9 is deformed by an outer force. Finally, the fingers 72a, b of the compression spring 7 are respectively engaged with the clasp 118 of the housing 1 and the hook 624 of the latching section 6. At this time, the compression spring 7 is in a compressed state, and the hook 624 of the latching section 6 is biased against an edge of the side groove 1144, adjacent the clasp 118 of the housing 1. The battery cover assembly is thus completely assembled by an expansion force exerted by the compression spring 7.

Figure 6:
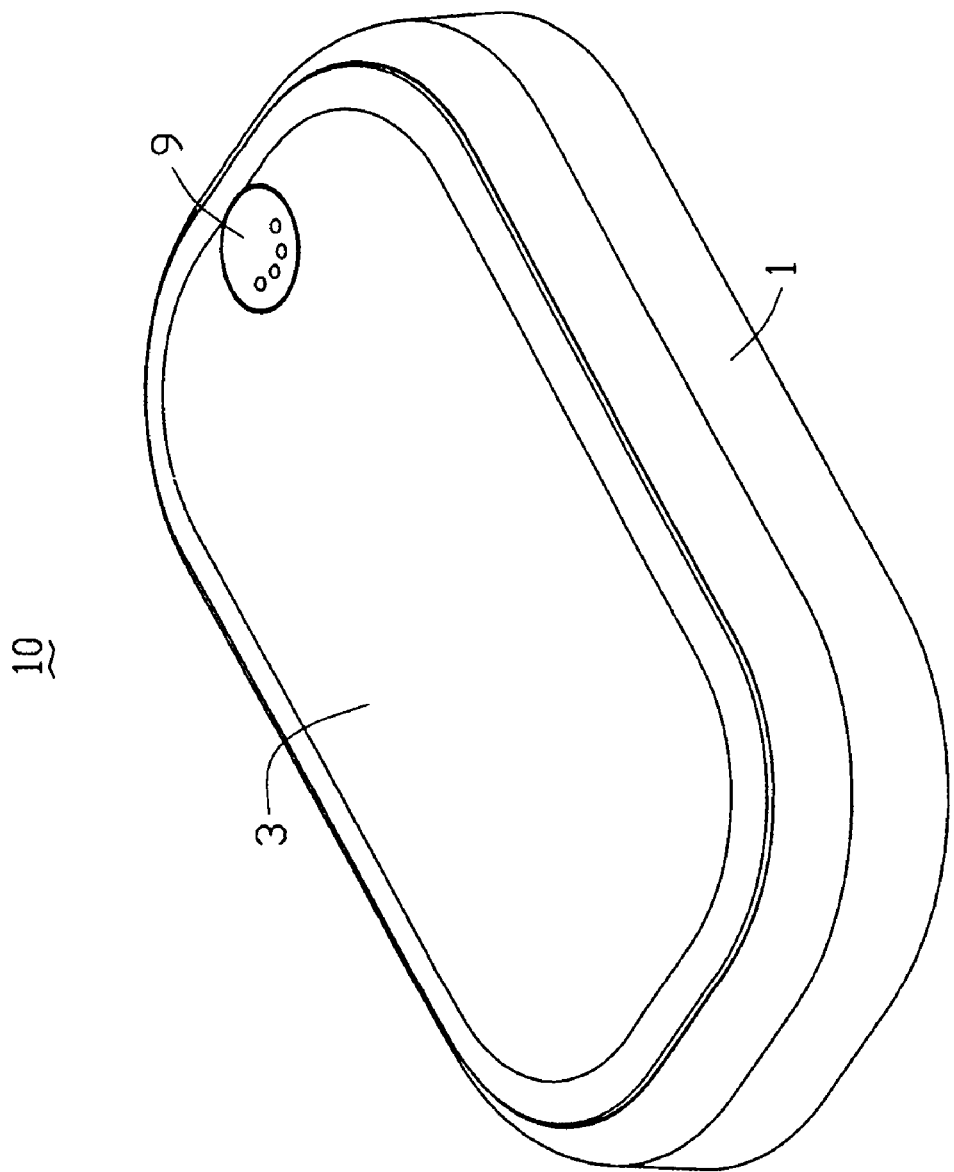
FIG. 6 is similar to FIG. 5, but viewed from another aspect.

Referring also to FIG. 6, when the cover 3 needs to be closed to the housing 1, the cover 3 is manually rotated toward the housing 1, and the shaft 5 is jointly rotated with the cover 3 relative to the housing 1. The claws 32 of the cover 3 are inserted into the claw holes 622 of the latching section 6, respectively The torsion spring 4 is twisted and thus has a torsional force associated therewith when the cover 3 is closed down onto the housing 1. During the above-described closing processes of the cover 3, the compression spring 7 is utilized to exert a contraction force to the hook 624 of the latching section 6. Due to this contraction force, the hook 624 of the latching section 6 is biased against an edge of the side groove 1144, adjacent the clasp 118 of the housing 1. The cover 3 is thus closed to the housing 1.

When the cover 3 needs to be opened to the housing 1, the button 9 is turned by applying an appropriate force thereto with the help of the convexities 96 of the button 9. Thus, the engaging board 8 is moved and thereby causes the stand arm 642 of the latching section 6 to move also. The claws 32 of the cover 3 disengage from the claw holes 622 of the latching section 6. The cover 3 is automatically rotated away the housing 1 by twisted force of the torsion spring 4. The cover 3 is thus opened from the housing 1. At the same time, the compression spring 7 rebounds, and the latching section 6 returns to its original position relative to the housing 1 under the contraction force of the compression spring 7.

In alternative embodiments, the compression spring 7 can be made of a nonmetallic material, such as plastic. Further, the compression spring 7 can instead be another kind of elastic means known in the art, such as a resilient cylinder. The torsion spring 4 can be omitted, with the cover 3 being manually rotated away from the housing 1 when the claws 32 of the cover 3 disengage from the claw holes 622 of the latching section 6.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A battery cover assembly for use in a portable electronic device, comprising:
    a housing defining a containing portion, a locking hole, and a button hole;
    a connecting member comprising a main body and a sliding section, the sliding section being bent relative to the main body;
    a cover comprising a sliding groove and a claw, the sliding section of the connecting member being slidably engaged in the sliding groove;
    a shaft rotatably engaged with the connecting member, the shaft being located in the containing portion of the housing;
    a latching section comprising a latching body and a stand arm extending from the latching body, the stand arm passing through the locking hole of the housing, the latching body having a claw hole defined therein, the claw of the cover being engaged in the claw hole;
    an engaging board defining a first hole and a fixing hole, the stand arm of the latching section being engaged in the fixing hole after the stand arm is passed through the locking hole of the housing; and
    a button received in the button hole after the button passed through the first hole of the engaging board.

2. The battery cover assembly as claimed in claim 1, wherein the housing comprises a partition wall, the containing portion, the locking hole and the button hole being defined in the partition wall.

3. The battery cover assembly as claimed in claim 2, wherein a recess is defined in a middle portion of the partition wall and is used to receive a battery.

4. The battery cover assembly as claimed in claim 2, wherein a groove and a clasp are formed in the partition wall, the groove being between the locking bole and the clasp of the housing.

5. The battery cover assembly as claimed in claim 4, wherein a hook is disposed in the latching body of the latching section adjacent the claw hole.

6. The battery cover assembly as claimed in claim 5, wherein the battery cover assembly further comprises a spring having two fingers, the fingers being engaged with the clasp of the housing and the hook of the latching section, respectively.

7. The battery cover assembly as claimed in claim 1, wherein the connecting member comprises a bent portion extending from the main body, the bent portion having a folded portion at one end thereof, a catching portion being formed in the connecting member between the bent portion and the main body.

8. The battery cover assembly as claimed in claim 1, wherein an indent and an elastic rib are defined in the cover, a length of the indent being larger than that of the sliding section of the connecting member, the rib and the indent together forming the sliding groove.

9. The battery cover assembly as claimed in claim 1, wherein a thin hole is defined in the cover, and the button is received in the thin hole.

10. The battery cover assembly as claimed in claim 1, wherein the battery cover assembly further comprises a torsion spring, the torsion spring being engaged with the shaft.

11. The battery cover assembly as claimed in claim 1, wherein the button comprises a main portion, a cantilever extending from the main portion, and a plurality of convexities, the convexities being disposed in the main portion.

12. A portable electronic device comprising a main housing and a battery cover assembly, the battery cover assembly comprising:
    a battery housing attached to the main housing;
    a cover defining a thin hole therein;
    a button received in the thin hole of the cover and rotatably engaging with the battery housing;
    a latching section slidably located in the battery housing, the latching section comprising a latching body engaging wit the cover and a stand arm extending from the latching body; and
    an engaging board engaging with the stand arm; when the button is turned, the engaging board being configured for being selectably moved and for thereby correspondingly moving the latching section so that the cover can thus be unlocked from the battery housing;
    wherein the battery housing comprises a partition wall, the partition wall having a locking hole end a button hole defined therein, the latching section interacting with the locking hole, the button hole being engaged by the button.

13. The portable electronic device as claimed in claim 12, wherein the latching section comprises a latching body and a stand arm, the stand arm extending perpendicularly from the latching body, the stand arm being movably engaged in the locking hole of the battery housing.

14. The portable electronic device as claimed in claim 13, wherein the cover comprises a pair of claws.

15. The portable electronic device as claimed in claim 14, wherein a pair of claw holes is defined in the latching body of the latching section, the claws of the cover engaging in the claw holes.

16. The portable electronic device as claimed in claim 15, wherein a hook is disposed in the latching body of the latching section, adjacent the claw hole apart from the stand arm.

* * * * *